United States Patent [19]

Wallis et al.

[11] Patent Number: 5,800,974
[45] Date of Patent: Sep. 1, 1998

[54] SILVER HALIDE IMAGING MATERIALS

[75] Inventors: Julian Wallis, Pinnacles; Kevin P. Hall, Leaden Roding; Stephen Newman, Bishop's Stortford; Dian Elizabeth Stevenson, Pinnacles, all of Great Britain

[73] Assignee: Imation Corp., Oakdale, Minn.

[21] Appl. No.: 941,566

[22] Filed: Sep. 8, 1992

[30] Foreign Application Priority Data

Sep. 12, 1991 [GB] United Kingdom ............... 9119518

[51] Int. Cl.$^6$ ...................................... G03E 1/42
[52] U.S. Cl. .................... 430/566; 430/435; 430/444; 430/448
[58] Field of Search ..................... 430/302, 419, 430/435, 444, 448, 456, 464, 566, 949

[56] References Cited

U.S. PATENT DOCUMENTS

| | | | |
|---|---|---|---|
| 2,710,801 | 6/1955 | Minsk et al. | 95/6 |
| 3,186,970 | 6/1965 | Schuler | 260/73 |
| 3,772,014 | 11/1973 | Scullard | 96/29 D |
| 3,847,618 | 11/1974 | Hofman et al. | 430/566 |
| 4,025,401 | 5/1977 | Fujiwara et al. | 204/98 |
| 4,098,829 | 7/1978 | Weimsheaker et al. | 568/744 |
| 4,525,562 | 6/1985 | Patel | 526/271 |
| 4,663,272 | 5/1987 | Nakamura | 430/542 |
| 4,927,744 | 5/1990 | Henzel et al. | 430/566 |

FOREIGN PATENT DOCUMENTS

| | | |
|---|---|---|
| 766708 | 9/1967 | Canada . |
| 0 232 679 | 8/1987 | European Pat. Off. . |
| 0 353 629 A2 | 2/1990 | European Pat. Off. . |
| 954 924 | 4/1964 | United Kingdom . |
| 1 318 213 | 5/1973 | United Kingdom . |

OTHER PUBLICATIONS

Research Disclosure 17364 (p. 2, lines 20–35).
J. Amer. Chem. Soc., vol. 71, pp. 403–410 (1949).
*The Theory of the Photographic Process*, Fourth Edition, 1977, Macmillan Publishing Co., Inc., Ch. 11, "Developing Agents and Their Reactions", p. 302.

*Primary Examiner*—Hoa Van Le
*Attorney, Agent, or Firm*—William K. Weimer

[57] ABSTRACT

A black and white photographic element comprising as a photosensitive medium a layer of a silver halide emulsion characterised in that the photosensitive medium comprises in the same layer or in an adjacent layer thereto a developer comprising a substantially non-diffusing polymeric compound having as a component part of its structure a plurality of units having a nucleus of general formula (I):

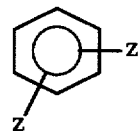

wherein;

each Z independently is a member selected from the group consisting of —OH and a group which leaves an —OH residue when contacted with an alkali (pH ≧10) at temperatures of ≦50° C.

6 Claims, No Drawings

SILVER HALIDE IMAGING MATERIALS

FIELD OF THE INVENTION

The present invention relates to imaging materials and in particular to low-polluting, black and white, silver halide photographic materials.

BACKGROUND TO THE INVENTION

In conventional processing of exposed black and white silver halide photographic materials, the exposed material comprising a support having at least one gelatino-silver halide emulsion layer is immersed in a developing bath containing a developing agent, then immersed in a fixer to remove excess silver halide and finally immersed in wash water. The developing bath is maintained as a separate processing bath and with continuous use, the bath becomes depleted and less efficient such that special techniques for replenishing the bath are normally required to maintain optimum processing efficiency. The developing bath normally contains a developing agent, typically hydroquinone or a derivative thereof, a preservative such as sodium sulphite and alkali to activate the developing agent. The developing bath may also contain supplementary additives such as sodium bromide as a restrainer, antifoggants etc.

Disposal of spent solutions is a problem which needs to be addressed as many local water authorities are placing increasingly stringent limitations on what can be disposed of in public sewer systems. Many papers have been published and commercial systems are available for the reclamation and recycling of the fixer. It is also possible to remove silver from wash water by techniques such as ion exchange or electrolysis. The disposal of waste developer is more problematical as it has no commercial value and although many papers have been written on systems for recycling and regenerating developer, none are available on the market.

In order to eliminate the problems associated with developing baths and the disposal of spent solutions, the prior art has resorted to incorporating various photographic developing agents and their precursors into the silver halide emulsion layer of the photographic element, or into layers adjacent thereto. Photographic elements of this nature are disclosed, for example, in U.S. Pat. Nos. 3,291,609, 3,262,781, 3,246,988 and 3,192,046, Canadian Patent Specification No. 766,708 and British Patent Specification No. 1045303. After exposure, such elements can be rapidly processed in an alkali bath. However, as hydroquinone is very soluble in alkaline solutions, it tends to leach out of the photographic material into the activator solution effectively contaminating the activator with hydroquinone and its reaction products, e.g., hydroquinone monosulphonate. To prevent the formation of humic acids, the activator must also contain a high level of sulphite as a preservative. Consequently, the disposal of waste activator presents almost as much of an environmental problem as the disposal of waste developer.

Research Disclosure No. 17364 discloses one solution to this problem in the form of non-polluting photographic elements comprising a support on which is coated a silver halide emulsion layer containing a small amount of a developing agent and a ballasted reducing agent which has sufficient reducing power to reduce the oxidised developing agent produced by silver halide reduction, thereby regenerating the developing agent in situ. Suitable silver halide developing agents are said to include hydroquinones, pyrocatechols, aminophenols and 3-pyrazolidones, amongst others. Examples of suitable hydroquinones includes alkylhydroquinones, such as methylhydroquinone and ethylhydroquinone, arylhydroquinones, alkoxyhydroquinones, halogenohydroquinones, acylhydroquinones, carboxyhydroquinones and acyloxyhydroquinones.

The 'ballasted reducing agent' is defined as a reducing agent carrying one or more ballast groups whose size and configuration are such that they render the reducing agent non-diffusable from the layer in which it is incorporated. Examples of particularly useful ballasted reducing agents are said to include ballasted hydroquinones including dialkylhydroquinones, such as those disclosed in French Patent Specification No. 1105049, and in particular dialkylhydroquinones in which a 2-alkylhydroquinone contains a second alkyl group in the 5 or 6-position on the hydroquinone nucleus, e.g., 2,6-dioctylhydroquinone, 2,6-didecylhydroquinone, 2,5-didodecylhydroquinone and 2,5-distearylhydroquinone. There is no disclosure of the use of a polymeric developing/reducing agent. Although capable of rapid processing there are disadvantages to this type of construction, namely:

(i) developer decomposition on ageing,
(ii) interference with gelatin hardening, and
(iii) staining and tanning of the processed material.

In a similar vein, U.S. Defensive Pat. No. 887024 discloses the use of t-butylhydroquinone and cyclohexylhydroquinone for incorporation directly into the emulsion as substantive, non-diffusing developing agents. Photographic elements prepared in this manner still suffer from the aforementioned problems, such as staining etc.

U.S. Pat. No. 4,663,272 discloses silver halide photographic materials comprising a polymer with a photographically useful group that is rendered non-diffusive by cross linking. The polymer comprises repeat units having a photographically useful group and repeat units having sulphinic acid or sulphinate groups. Cross-linking via the latter renders the polymer non-diffusive subsequent to coating. In some embodiments the photographically useful group is a developing agent, but there is no disclosure of developing agent groups having two free hydroxyl groups.

British Patent Specification No. 1318213 discloses photosensitive compositions which comprise silver halide, gelatin and a novolak resin formed by the condensation of hydroquinone with formaldehyde. The compositions are coated on aluminium base, exposed, processed in alkaline activator solution, fixed, then subjected to further processing in order to wash off unexposed portions of the coating, leaving a lithographic printing plate. The novolak resin is of comparatively low molecular weight (300 to 600 is recommended), and apparently tans the gelatin in exposed areas as it reduces the silver halide to silver metal. Such a tanning action is undesirable in conventional photographic films and papers, and it has been found that the hydroquinone-formaldehyde polymers described in this patent show poor substantivity, diffusing readily from a coated emulsion into an alkaline activator solution.

Hydroquinone derivatives have been widely used as oxidised developer scavengers, for example, as disclosed in U.S. Pat. Nos. 2,336,327, 2,360,290, 2,403,721, 2,728,659, 3,700,453, 3,982,944, 4,366,236, 4,447,523 and 4,575,481 and European Published Patent Application No. 353629. The art teaches that the scavenger compounds may be rendered substantive, that is, non-diffusing, by being incorporated into the photographic elements as an "oil in water dispersion", in which the scavenger compound(s) is dissolved in a solvent, which is subsequently dispersed as fine droplets in an aqueous gelatin solution and coated onto the photographic element. Alternatively, the scavenger compound(s) may be dispersed in a polymer latex or as a dispersion of solid particles. In all these cases, the hydroquinone derivative is only present at low levels (when compared mole for mole with the silver halide content) and it is usually coated in a separate layer from the emulsion.

U.S. Pat. No. 2,710,801 discloses the addition of non-diffusing polymeric compounds comprising as a repeating component thereof a structure represented by:

silver halide emulsion containing colour couplers to prevent staining in colour forming silver halide photographic materials. Examples of such polymeric compounds include poly (vinyl hydroquinone) and copolymers thereof, e.g., poly (vinylhydroquinone-co-acrylic acid) and poly (vinylhydroquinone-co-methacrylic acid). However, no mention is made for the use of such compounds as a primary developer for black and white silver halide photographic materials.

The synthesis of poly(vinyl hydroquinone) is described in *J. Amer Chem. Soc. Vol.* 71 pages 402 to 410 (1949), but there is no mention of photographic use.

U.S. Pat. No. 4,098,829 disclosed poly(vinylbenzyl hydroquinone) for use as an antioxidant in plastics, rubber, oils and foodstuffs.

U.S. Pat. No. 4,525,562 discloses water-soluble copolymers of allyl-substituted catechols with acidic comonomers as additives for drilling fluids. U.S. Pat. No. 4,025,401 discloses graft copolymers comprising a linear polyolefin main chain with side chains composed of copolymers of dihydroxystyrenes. The preferred dihydroxystyrene is vinyl catechol, but there is no disclosure of linear polymers or copolymers of this material. The end use for the graft copolymers is as ion-exchange membranes in electrolysis cells.

Japanese Patent Applications Nos. 61-185501, 61-181802, 60-135404 and 53-028690 disclose polymers bearing pendant catechol (or other dihydric phenol) groups, prepared by chemical modification of polystyrene derivatives. The products are used as protective coatings or as metal ion adsorbents.

The present invention seeks to provide alternative, low-polluting silver halide photographic materials.

BRIEF SUMMARY OF THE INVENTION

According to the present invention there is provided a black and white silver halide photographic element comprising as a photosensitive medium a layer of a silver halide emulsion and in the same and/or an adjacent layer thereto a developer comprising a substantially non-diffusing polymeric compound having as a component part thereof a plurality of units having a nucleus of general formula (I):

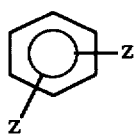

in which;
each Z independently represents —OH or a group which leaves an —OH residue when contacted with an alkali (pH ≧10) at temperatures of ≦50° C.

According to a further aspect of the present invention there is provided a process for developing a photographic image in an imagewise exposed black and white photographic element of the invention, which process comprises contacting the exposed element with an alkaline activator.

Owing to the polymeric nature of the compound, the developer is substantially non-diffusing and in particular will not diffuse substantially in aqueous alkali, which is a common activator solution. Thus, very little (if any) of the developer is able to dissolve or diffuse into the activator solution, the bulk of the developer remaining within the photographic element. Consequently, the activator is polluted much less rapidly than activator solutions used to process conventional photographic materials. Moreover, polymeric developers are generally more stable than conventional substantive developing agents which tend to stain on prolonged storage.

DESCRIPTION OF PREFERRED EMBODIMENTS

The polymeric compounds used in the practice of the present invention generally comprise a plurality of units of general formula (I) which may be incorporated into the backbone of the polymer and/or into groups pendant thereto. The latter is preferred.

In the preferred embodiments of the invention, each group represented by Z is —OH although as aforesaid, Z may also represent groups which leave an —OH residue after treatment using any of the appropriate techniques known in the art. In such cases, Z preferably represents a group which is cleavable to OH on contact with an alkali solution, generally having a pH of at least 10, at temperatures of up to about 50° C. Examples of such alkali-labile precursor groups include acylated precursors represented by

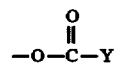

where Y represents an alkyl or a halogenoalkyl group comprising up to 5, preferably up to 3 carbon atoms. Examples of groups represented by Y include: methyl, ethyl, propyl, chloromethyl, dichloromethyl, trichloromethyl, chloroethyl, dichloroethyl, trichloroethyl, bromomethyl, fluoromethyl, difluoromethyl, trifluoromethyl etc. Such acyl precursors may be prepared by esterification of the units of general formula (I) as disclosed in Canadian Patent No. 766708. Esterification can be effected by heating the polymeric compound with an organic acid, anhydride or halide. A basic condensation can be employed, if desired. When an acid or anhydride is used for the esterification, improved yields and shorter reaction times may also be achieved by use of an azeotropic agent, such as toluene, benzene etc.

Polymeric compounds incorporating pendant groups of general formula (I) generally comprise a nucleus represented by general formula (II) with the groups represented by Z preferably being in the 2,5- or 3,4-positions:

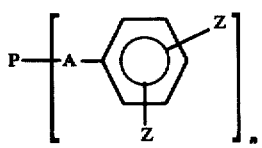

in which;
A represents a bond or a divalent linking group,
P represents a polymeric backbone,
Z is as defined previously, and
n is an integer >5. Z is preferably —OH.

P generally represents a polymeric backbone derived from addition, condensation or ring-opening polymerisation and may thus comprise a purely hydrocarbon chain (e.g., as a result of vinyl polymerisation) or it may include hetero-atom linkages (e.g., as a result of ring-opening polymerisation of epoxides, aziridines etc.) or linkages, such as ester, amide, urea, carbonate, urethane etc., resulting from known polycondensation processes. P may bear further pendant groups in addition to those shown in general formula (II), e.g., as a result of the copolymerisation of different monomers.

A represents either a bond or a divalent linking group linking the units of general formula (I) to the polymeric backbone P. Groups represented by A preferably contain no more than 10 catenary atoms chosen from C, N, O, S and Se.

In the preferred embodiments of the invention, P represents a hydrocarbon chain, A a single bond and n has a value >50.

Polymeric compounds represented by general formula (II) may be prepared by polymerisation or copolymerisation of monomers comprising the units of general formula (I). Preferred monomers comprise a nucleus represented by general formula (III):

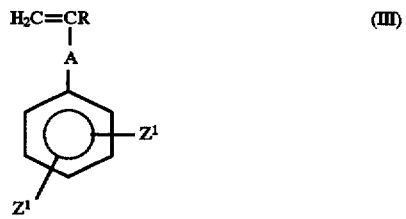

(III)

in which;

A is as defined previously,

R represents hydrogen, an alkyl group comprising up to 5 carbon atoms or a halogen atom, e.g., chlorine, and $Z^1$ is either Z (defined as previously), or a group which may be converted to Z by suitable chemical treatment subsequent to the polymerisation. For example, $Z^1$ may represent —$OCH_3$, which may be converted to OH by treatment with boron tribromide after polymerisation has taken place. Other possibilities for $Z^1$ include —$OCH_2C_6H_5$, —$OC_4H_9$ (tert) and —$OSi(CH_3)_3$. When the two $Z^1$ groups occupy adjacent positions on the phenyl ring, they may form a fused ring, such as, a methylene dioxy group. Preferably $Z^1$ is —$OCH_3$, with the para-(2,5) and ortho-(3,4) substitution patterns being preferred.

Polymeric compounds prepared by polymerisation of the monomers of general formula (III) followed, if necessary, by chemical conversion of the $Z^1$ groups, thus comprise as a repeating unit thereof a structure having a nucleus represented by:

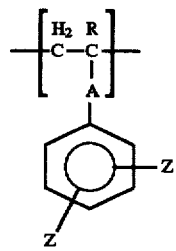

in which;

A, R and Z are as defined previously.

The monomers of general formula (III) may be polymerised by any of the conventional techniques either alone or together with one or more comonomers. Suitable comonomers include: acrylic and modified acrylic acids, e.g., methacrylic acid, and esters and amides thereof; itaconic acid and esters thereof; maleic acid and anhydrides thereof; styrene and alkylstyrenes, e.g., α-methylstyrene; vinyl ethers; vinyl esters; conjugated dienes; N-vinylpyrrolidone and 2-vinyloxazolones. Where appropriate, the non-vinyl portion of the above comonomers may bear additional substituents selected from alkyl, alkoxy, alkoxycarbonyl, alkanoyloxy; alkanoylamino, alkaminocarbonyl, alkylthio, alkylsulphonyl, alkylaminosulphonyl, alkoxysulphonyl and ketone groups, each of which groups may comprise up to 5 carbon atoms, aryl groups comprising up to 10 carbon atoms, halogen atoms, hydroxyl, nitro, nitrile, carboxylic acid, carboxamide, sulphonic acid and sulphonamide groups. Preferably, the comonomer does not constitute more than 50% of the repeat units of the polymeric compound. More preferably, all the repeat units of the polymeric compound are derived from monomers of general formula (III). Examples of suitable copolymers are disclosed in U.S. Pat. No. 2,710,801.

Most preferably, the polymeric compound is poly(vinyl hydroquinone) having the following structure:

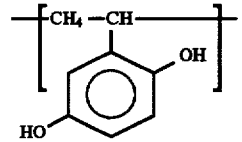

which may be prepared by polymerisation of vinyl hydroquinone (as described in U.S. Pat. No. 2,710,801), or by polymerisation of 2,5-dimethoxystyrene followed by cleavage of the methyl groups, e.g., with $BBr_3$. Another preferred polymeric compound is poly(vinylcatechol) which is believed to be new and forms a further aspect of the invention. Thus, the invention also provides a polymeric compound having a chain comprising a plurality of units having a nucleus of the general formula:

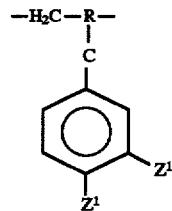

in which;

R and $Z^1$ are as defined above.

The compounds may be homopolymers or copolymers incorporating comonomers as described above. Preferably $Z^1$ is OH and R is H. The compounds preferably have a molecular weight of at least $1 \times 10^3$, preferably from $20 \times 10^3$ to $500 \times 10^3$.

Polymeric compounds of general formula (II) in which A is other than a single bond may also be prepared by reacting a suitable preformed polymer with one or more reactive species comprising the requisite unit of general formula (I). Such reactive species may comprise a compound having a nucleus represented by general formula (IV):

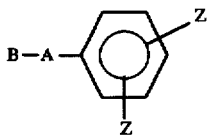

in which;

B represents a functional group capable of reacting with the preformed polymer, and A and Z are as defined previously. Z is preferably —OH with the para-(2,5) and ortho (3,4)-substitution patterns being preferred.

Suitable preformed polymers are those bearing a plurality of groups able to react with the aforementioned reactive species (IV) and many examples are known in the art. Examples of such groups borne by readily available polymers include: amine, alcohol, anhydride, isocyanate, carboxylic acid, azolactone and epoxide. Consequently, there exists a wide range of possible identities for B in general formula (IV) including: amine, alcohol, isocyanate, acid chloride, carboxylic acid and aldehyde. An example of a polymer of general formula (II) produced by modification of a preformed polymer comprises as a repeating unit thereof a structure represented by general formula (V) which is formed by reaction of (IV) (B=CHO) with poly(vinyl alcohol):

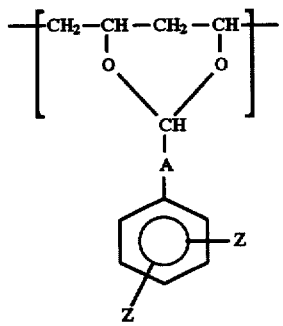

in which;

A and Z are as defined previously.

In a further embodiment, the units of formula (I) may be incorporated into the backbone of the polymeric compound, each unit generally comprising a nucleus represented by general formula (VI) with the groups represented by Z in the ortho or para-substitution patterns being preferred:

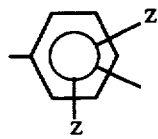

in which;

Z is as defined previously. Z is preferably —OH.

An example of such a polymeric compound incorporating the units of general formula (VI) into its backbone structure comprises as a repeating unit thereof a monomer represented by general formula (VII):

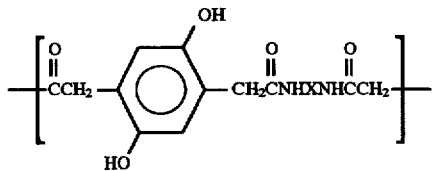

in which;

X represents —$CH_2CH_2(OCH_2CH_2)_yOCH_2CH_2$— where y is 0 or a positive integer. Another example is the condensation product of hydroquinone and formaldehyde.

The phenyl rings of each unit (I) may themselves possess one or more substituents selected from alkyl groups comprising up to 5 carbon atoms, alkoxyl groups comprising up to 5 carbon atoms, hydroxyl groups and halogen atoms.

The polymeric compound generally has a molecular weight of at least $1 \times 10^3$ to ensure that the developer is substantive in the emulsion layer. Preferably the polymeric compound has a molecular weight of from $20 \times 10^3$ to $500 \times 10^3$.

The polymeric compound may be incorporated in the silver halide emulsion layer or in a separate but adjacent under/overlayer thereto. Alternatively, the polymeric compound may be present in both the emulsion layer and the under/overlayer. When present in an adjacent layer, the polymeric compound is typically dispersed in a water-permeable hydrophilic colloid, e.g., gelatin.

The concentration of the polymeric compound will vary, depending upon the particular compound involved and the location of the compound within the photographic element. That is, if the polymeric compound is incorporated within the silver halide emulsion layer, it may be desirable to use a somewhat different concentration than would be used if the polymeric compound were incorporated in a layer adjacent to the photographic silver halide emulsion. For incorporation in a layer contiguous to the silver halide emulsion layer, somewhat larger concentrations of the polymeric compound can be tolerated without adverse effects and indeed may be desirable.

The polymeric compound is generally added to the silver halide emulsion layer (or any adjacent layer thereto) in an amount sufficient to provide an equivalence of up to 1 mole of the units of formula (I) per mole of silver halide. Preferably, the polymeric compound is present in an amount sufficient to provide an equivalence of from 0.1 to 1 moles of the units of formula (I) per mole of silver halide. More preferably, the polymeric compound is present in an amount sufficient to provide an equivalence of from 0.25 to 1 moles of the units of formula (I) per mole of silver halide.

The polymeric compound is generally added to the liquid silver halide emulsion and/or the colloid dispersion of any adjacent layer as a dispersion of solid particles, although other suitable methods may also be employed depending upon the solubility characteristics of the chosen polymeric compound. The average size of the particles is generally no greater than 10 μm, preferably no greater than 1 μm and typically in the range from 0.1 to 1 μm. After addition of the dispersion of the polymeric developer to the liquid emulsion or colloidal dispersion, the mixture is stirred to assure uniform results, or passed through a blending device, such as a colloid mill or WARING Blender. A uniform coating can then be made on a suitable support and the coating dried.

The light-sensitive halide emulsions employed in the photographic elements of the invention can include coarse, regular or fine grain silver halide crystals and can be comprised of such silver halides as silver chloride, silver bromide, silver bromoiodide, silver chlorobromide, silver chloroiodide, silver chlorobromoiodide and mixtures thereof.

The silver halide grains may comprise regular crystals of cubic, orthorhombic, tabular, octahedral or tetrahedral habit or irregular crystals such as spherical or composite grains. The silver halide grains may be formed with a uniform phase from the core to the surface layer or they may be dissimilar in phase. It is quite permissable to use two or more independently prepared grain types of varying size, shape etc., when preparing the photosensitive elements of the invention. The emulsions can be negative working or direct positive emulsions. They can form latent images predominantly on the surface of the silver halide grains or in the interior of the silver halide grains.

The silver halide emulsions may also comprise one or more dopants such as cadmium, lead and thallium salts and rhodium, iridium and ruthenium salts or complex salts. Such dopants are normally added to the silver halide emulsion either during formation of the silver halide grains or in the course of physical ripening.

Fine grain emulsions having a high silver chloride content, that is, emulsions comprising at least 50% by weight silver chloride and preferably at least 60% by weight silver chloride are preferred. The average grain size is generally no greater than 3 μm, preferably no greater than 1 μm and typically no greater than 0.3 μm.

The photographic silver halide emulsions can contain other addenda conventional in the photographic art. Useful addenda are described, for example, in *Research Disclosure*, December 1978, Item 17643 and include spectral sensitizing dyes and desensitizers, antifoggants, absorbing materials such as filter dyes and UV absorbers, light scattering materials, coating aids, plasticisers and lubricants, and the like.

Gelatin is preferably used as the emulsion binder although any of the known water-permeable hydrophilic colloids can be used as the binder for the photographic emulsion/adjacent layer. For example, other useful materials might include gelatin derivatives, e.g., agar, graft copolymers of gelatin to other high polymers, proteins such as albumin and casein, hydrolysed cellulose derivatives such as hydroxyethyl cellulose, carboxymethyl cellulose, cellulose sulphate esters etc., sugar derivatives such as sodium alginate, starch derivatives etc., and synthetic homopolymers or copolymers such as hydrophilic polyvinyl homopolymers and copolymers, e.g. poly(vinyl alcohol), poly(vinyl pyrrolidone), poly(vinyl imidazole) and poly(vinyl pyrazole), poly(acrylates), poly(methacrylates) and poly (acrylamides).

The emulsion layer and/or any adjacent layer normally comprises an auxiliary developing agent to enhance the rate of development of the photographic element during subsequent processing. The concentration of the auxiliary developing agent can be varied and, of course, no auxiliary developing agent need be added to the emulsion layer or any adjacent layer if it is present in the solutions used to process the exposed element, e.g., the activator solution. Useful concentrations of auxiliary developing agents vary from $10^{-1}$ to $10^{-3}$ moles developing agent per mole of silver halide although depending upon the particular auxiliary developing agent employed, larger or smaller quantities can be used.

Typical auxiliary developing agents include those disclosed in Canadian Patent Application No. 791038. Auxiliary developing agents described in this application include 3-pyrazolidone compounds containing an alkyl (e.g., methyl, ethyl etc.) or aryl substituent which can be hydrolyzed from the 3-pyrazolidone compound by treatment with the above activator solutions to produce the desired auxiliary developing compound. Other suitable auxiliary developing agents include, for example, 1-phenyl-3-pyrazolidone, 1-p-tolyl-3-pyrazolidone, 1-phenyl-5-methyl-3-pyrazolidone, 1-acetamidophenyl-3-pyrazolidone, 3-acetoxy-1-phenyl-3-pyrazolidone (Enol ester), 2-(pyridinium acetyl)-1-phenyl-3-pyrazolidone chloride, 1-phenyl-4,4-dimethyl-3-pyrazolidone, 1-phenyl-4-methyl-3-pyrazolidone, 1-phenyl-2-benzoyl-3-pyrazolidone, 1-phenyl-2-lauroyl-3-pyrazolidone, 1-phenyl-2-chloroacetyl-3-pyrazolidone and aminophenols. Preferred auxiliary developing agents are Dimezone S, phenidone and metol.

The silver halide emulsion may also contain a sensitiser so as to render the emulsion sensitive to any radiation falling within the absorption spectrum of the chosen sensitiser, as described, for example, in Neblette's Handbook of Photography and Reprography pp. 73 to 112 (9th Edition).

Preferred sensitisers include cyanine and merocyanine dyes, the use of which is well known to the person skilled in the art.

The photographic emulsion may also be chemically sensitised. Known methods for chemical sensitisation of silver halide emulsions include sulphur sensitisation, reduction sensitisation and noble metal sensitisation. Chemical sensitisation may be effected by any or a combination of such methods.

The usual method for noble metal sensitisation is gold sensitisation and for this purpose, a gold compound, generally a complex salt of gold, e.g., potassium chloroaurate, auric trichloride etc., is utilized. Complex salts of other noble metals such as platinum, palladium, rhodium etc., may also be used. Sulphur sensitisers include, in addition to sulphur compounds contained in gelatin, various sulphur compounds such as thiosulphates, thiourea compounds, thiazoles and rhodanines e.g., allyl thiocarbonate, thiourea, allyl isothiocyanate, cysteine etc. Examples of such methods are described in U.S. Pat. No. 2,448,060, 2,540,085, 2,597,856 and 2,597,915 and British Patent No. 618961.

Photographic silver halide emulsions useful in the present invention can also be sensitized by other means, such as by alkylene oxide polymers, many of which are well known to those skilled in the photographic art. Typical polyalkylene oxide polymers include those disclosed in U.S. Pat. Nos. 2,423,549 and 2,441,389.

The emulsions may also be chemically sensitized with reducing agents such as stannous salts (U.S. Pat. No. 2,487,050), polyamines such as diethylene triamine (U.S. Pat. No. 2,518,698), polyamines such as spermine (U.S. Pat. No. 2,521,925), or bis-(β-aminoethyl) sulfide and its water-soluble salts (U.S. Pat. No. 2,521,926).

The emulsions of the invention can also contain speed-increasing compounds of the quaternary ammonium type as disclosed in U.S. Pat. Nos. 2,271,623, 2,238,226, 2,334,864, or the thiopolymers disclosed in Canadian Patent Application Nos. 783752 and 783753.

The photographic emulsion may be a high contrast emulsion, e.g., lith films, containing a hydrazine compound or other additives known in the art. Such materials are disclosed, for example, in U.S. Pat. Nos. 2,322,027, 2,419,974, 2,419,975, 4,166,742, 4,168,977, 4,211,857, 4,224,401, 4,743,739, 4,272,606, 4,272,614, 4,311,781 and 4,323,643.

The photographic emulsion may also include a variety of compounds for the prevention of fog during production, storage or photographic processing or for the purpose of stabilising the photographic qualities of the emulsion. Such compounds are commonly referred to as antifogging agents or stabilisers and include: azole compounds (e.g., benzothiazolium salts, nitroimidazoles, chlorobenzimidazoles, bromobenzimidazoles, mercaptothiazoles, mercaptobenzothiazoles, nitrobenzothiazoles etc.), mercaptopyrimidines, thioketo compounds (e.g., oxazolinethione etc.), azaindenes (e.g., triazaindene), tetraazaindenes (particularly, 4-hydroxy-substituted-1,3,3a,7-tetraazaindenes, pentaazaindenes etc.), benzenethiosulphonic acid, benzenesulphinic acid, benzenesulphonamide etc. Amongst these compounds, benzotriazoles (e.g., 5-methylbenzotriazole) and nitroindazoles (e.g., 5-nitroindazole) are preferred.

The photographic emulsions may also be stabilized with mercury compounds, e.g., as disclosed in U.S. Pat. Nos. 2,728,663 2,728,664 and 2,728,665.

The photographic emulsions may also contain inorganic or organic hardening agents such as chromium salts (e.g., chrome alum, chromium acetate etc.), aldehydes (e.g., formaldehyde, glyoxal, glutaraldehyde etc.), N-methylol compounds (e.g., dimethylolurea, methyloldimethylhydantoin etc)., dioxane derivatives (e.g., 2,3-dihydroxydioxane etc.), active vinyl compounds (e.g., 1,3, 5-triacryloylhexahydro-s-triazines, 1,3-vinyl sulphonyl-2-propanol etc.), active halogen compounds (e.g. 2,4-dichloro-6-hydroxy-s-triazine etc.) and mucohalogenic acids (e.g., mucochloric acid, mucophenoxychloric acid etc.). These hardening agents may be incorporated alone or in combination.

The photographic emulsion may also comprise a variety of surface active agents for various purposes, such as the improvement of coating properties, antistatic properties, slip properties, emulsion dispersibility, anti-adhesion properties, and photographic properties (for example, development acceleration, increase in contrast, sensitisation etc.).

The photographic emulsion may further comprise a matting agent such as silica, magnesium oxide, polymethyl methacrylate etc., for the purpose of preventing adhesion.

The photographic elements are generally prepared by coating the emulsion (together with any adjacent layers) onto a suitable support material using any of the coating procedures known in the art. Suitable support materials include: metal films, glass, cellulose ester films, such as, cellulose acetate, cellulose diacetate, cellulose triacetate, cellulose acetate propionate, cellulose acetate butyrate and cellulose nitrate, polyolefin films, such as, poly(ethylene), poly(ethylene terephthalate), poly(propylene), poly(styrene) and other polyesters, poly(vinyl acetal) films, such as poly (vinyl butyral) and poly(vinyl formal) and polycarbonates. Paper supports, e.g., rag content paper and pulp paper, as well as partially acetylated paper or paper coated with a layer of barium sulphate or an olefin such as poly(ethylene) can also be used. The thickness of the support is generally from about 5 to 200 µm. The support may be in any form, such as, for example, sheets and rolls.

The photographic elements of the invention can also contain one or more ancillary layers known in the art, such as overcoat layers, spacer layers, filter layers, antihalation layers, pH lowering layers, timing layers, opaque reflecting layer, opaque light-absorbing layers and the like.

The photographic elements of the invention comprising a polymeric developer, either in the photographic silver halide layer and/or an adjacent layer thereto, can be simply and rapidly processed after exposure by contacting the exposed element with an activator solution. As the polymeric developer is substantive in the binder matrix of the emulsion layer, waste activator does not contain large amounts of the developer as occurs in conventional systems.

Activators are well known in the art, a commercially available example being "RAPIDOPRINT", sold by Agfa. A typical activator comprises an aqueous solution of an alkaline material, e.g., KOH, NaOH, $NH_4OH$, $K_2CO_3$ and $Na_2CO_3$, together with a preservative, such as sodium sulphite and optionally a restrainer, such as potassium or sodium bromide. The activator solution generally has a pH of from 8 to 14, preferably at least 9 and more preferably at least 10.5. The development of the photographic elements of the invention may be carried out at various temperatures, e.g., a temperature in the range from 10° to 40° C., for a relatively short time which may vary from 1 second to 5 minutes. If desired, the photographic elements may be processed in conventional developer solutions.

The activator solution may be applied to the exposed element in any number of known ways, such as by dipping, spraying or other suitable surface applications.

In order to improve the sensitometry of the photographic elements of the invention, a silver halide complexing salt may advantageously be included in the activator as taught in U.S. Pat. No. 3,622,332. Silver halide complexing salts are known in the art, examples of which include thiocyanate and thiosulphate salts and aminoalcohols, e.g., 2-aminoethanol. Preferred silver halide complexing salts are ammonium thiocyanate, ammonium thiosulphate and thiocyanate and thiosulphate salts of alkali and alkali earth metals, such as sodium and potassium. The silver halide complexing salt generally comprises up to 10% by weight of the activator with a typical value in the range from 0.5 to 6%.

Alternatively, the exposed element may be contacted with a thin film of the alkaline activator. The use of thin films of activator is known and disclosed, for example, in *Research Disclosure No.* 17364 (1978). In addition to improving the sensitometric properties of the photographic element, only minimal amounts of activator need be applied to the element thereby reducing the level of waste. At such low levels most, if not all, waste activator 'carried over' into the fixer would be neutralised therein.

Moreover, the photographic element itself may advantageously comprise one or more pH-lowering layers (sometimes referred to as acid or neutralising layers) to neutralise any waste activator in situ before addition to the fixer solution. Thus, by combining the substantive nature of the polymeric developer with the use of such activator/pH-lowering layers it is possible to produce very low-polluting photographic elements.

In addition to the alkaline components, the activator may advantageously comprise a thickening agent, e.g., a water soluble cellulose derivative, such as hydroxyethyl cellulose or a carboxymethyl cellulose alkali salt, e.g., sodium carboxymethyl cellulose, to increase the viscosity of the film and make it more adaptable for continuous processing. The thickening agent is usually added in an amount sufficient to provide a viscosity in the range from 0.1 to 200 $Nsm^{-2}$ (0.1 to 200 Pl), typically in an amount from 1 to 5% by weight of the activator. The activator may also comprise a silver halide complexing salt in the amounts defined previously.

The photographic elements of the invention may be used in all areas of black and white photography, but are particularly useful in graphic arts films and papers, e.g., daylight handleable contact films, laser scanner films etc. Another major area of utility is in printing plates of the diffusion transfer type, similar to those sold under the trade mark ONYX by Minnesota Mining and Manufacturing Company. Such materials are described, for example, in U.S. Pat. No.

4,361,635 and comprise an upper layer of nucleating sites for the physical development of a silver image. When processed in a processing solution comprising a silver halide solvent, silver halide in the unexposed areas dissolves in the processing medium, then diffuses to the surface layer where it contacts the nucleating species and precipitates as metallic silver. The resulting silver image can be used for lithographic printing.

This invention will now be described with reference to the following Examples.

EXAMPLE 1

This Example details the synthesis protocol used to prepare the poly(vinyl hydroquinone) and poly(vinyl catechol) used in Examples 2 to 10.

1. Synthesis of 2,5-dimethoxystyrene n-butyllithium (100 ml, 2.5M solution in hexane, 0.25 mol) was added dropwise, over 1 hour, to a stirred suspension of methyl triphenylphosphonium bromide (92.8 g, 0.26 mol) in anhydrous tetrahydrofuran (THF) (500 ml) at room temperature under nitrogen. Stirring was continued for half an hour after addition was complete. The 2,5-dimethoxybenzaldehyde (recrystallised from ethanol, 0.25 mol, 41.5 g) dissolved in anhydrous THF (300 ml) was added dropwise over 1 hour to the well stirred, orange solution. Stirring was continued for half an hour after the addition was complete. The reaction mixture was diluted with ether (1000 ml) and poured onto cold water (1500 ml). The organic layer was separated off, washed with water (2×1000 ml), dried ($Na_2SO_4$) and filtered. Evaporation of the filtrate yielded a yellow oily solid.

The residue was washed with cold 40 to 60 petrol (3×100 ml) to extract the styrene from remaining triphenylphosphine oxide. Evaporation of the combined petrol solutions gave a yellow oil. Distillation of the crude product gave 2,5-dimethoxystyrene as a colourless oil [yield 60 to 75%; bp 61° to 63° C./0.2 mm Hg; $^1$H nmr ($CDCl_3$) 6.7 to 7.2 (m, 4H), 5.71 (dd, 1H), 5.26 (dd, 1H), 3.79 (s, 3H) and 3.78 (s, 3H); IR (film) 3087, 2999, 2944, 2835, 1626, 1581, 1493, 1219 and 1039 $cm^{-1}$].

2. Synthesis of Poly(2,5-dimethoxystyrene)

The 2,5-dimethoxystyrene (20.7 g, 0.126 mol) prepared in (1) above, toluene (sodium dried, 23 ml) and azobis-isobutyronitrile (AIBN), commercially available from Aldrich Chemicals, (0.07 g, 4.4×10$^{-4}$ mol, 0.35% equivalent) were combined and degassed with a stream of nitrogen for half an hour. The mixture was heated with stirring, under a nitrogen atmosphere for 28 hours at 65° C. (oil bath temperature). The mixture was allowed to cool to room temperature under nitrogen before addition of toluene (50 ml) to dilute the product. The resulting solution was added dropwise to rapidly stirred methanol (1500 ml) and a white precipitate filtered off, washed with methanol and dried in vacuo to yield poly(2,5-dimethoxystyrene) (16.5 g, 80% yield). Mn=49300, Mw=80000 (by GPC in THF solution, polystyrene standard).

3. Synthesis of Poly(vinyl hydroquinone)

The poly(2,5-dimethoxystyrene) prepared in (2) above (16 g, 0.098/n mol), was dissolved in dichloromethane (400 ml) and the solution degassed with a stream of nitrogen for half an hour. The solution was cooled to −70° C. ($CO_2$/acetone bath) while maintaining an inert atmosphere and boron tribromide (0.2 mol, 50 g, 19 ml) in dichloromethane (150 ml) added dropwise to the stirred solution over 2 hours. The internal temperature was maintained at <−60° C. throughout the addition. Once the addition was complete, the pale orange solution was allowed to warm up slowly to room temperature. A pale cream precipitate started to form at approximately −10° C. The mixture was allowed to stir overnight at room temperature (18 hours).

The reaction mixture was cooled (ice bath) and water (200 ml) was added carefully to the vigorously stirred suspension. The reaction is exothermic and the addition was controlled to maintain an internal temperature below 35° C. After the addition was complete, stirring was continued for a further half an hour. The mixture was filtered under suction and the solid was washed with water and dried in vacuo over phosphorus pentoxide.

To purify the polymer, the solid was dissolved in THF (250 ml) and this solution was added dropwise to rapidly stirred 40 to 60 petrol (4 litres). The pale cream solid was filtered off, washed with a little pentane and dried in vacuo to constant weight. Yield 100%, Mn=60200, Mw=181000 (by GPC in THF solution, polystyrene standards).

4. Synthesis of 3,4-dimethoxystyrene

Following the same procedure as for the 2,5-isomer, but starting with 80 g of 3,4-dimethoxybenzaldehyde, there was obtained 57.5 g 3,4-dimethoxystyrene (bp 78° C. at 0.4 mm Hg).

5. Synthesis of Poly(3,4-dimethoxystyrene)

The 3,4-dimethoxystyrene (51 g, 0.31 mol) prepared in (4) above, AIBN (0.53 g, 9.0×10$^{-4}$ mol, 0.3% equivalent) and dry toluene (50 ml) were combined and degassed with a stream of nitrogen for 30 minutes, then stirred under nitrogen atmosphere for 42 hours at 75° C. (oil bath temperature). After cooling to room temperature, 250 ml toluene was added and the mixture added slowly to methanol (31) with rapid stirring. The precipitate was collected, washed with methanol and dried in vacuo over $P_2O_5$. Yield 39.15 g Mn=47300, MW=75400 (by GPC in THF, polystyrene standards).

6. Synthesis of Poly(vinyl catechol)

The poly(3,4-dimethoxystyrene) (29.28 g, 0.179 mol) prepared in (5) above was dissolved in dichoromethane (900 ml) and the solution degassed with nitrogen for 30 minutes. Boron tribromide (98.7 g, 0.4 mol) in dichloromethane (300 ml) was added dropwise with stirring at room temperature over two hours. The mixture became pink and gelatinous, then formed a straw coloured solution once the addition was completed. After stirring a further three days at room temperature, water (11) was added slowly with cooling, then stirring was continued for five hours at room temperature. The product was filtered off, washed with water and dried in vacuo over $P_2O_5$. It was purified by reprecipitation from the THF into petroleum ether, collected, and dried to constant weight in vacuo over $P_2O_5$ and paraffin wax. Yield 24.43 g. Molecular weights could not be determined due to incompatibility with the GPC column.

EXAMPLE 2

A silver chlorobromide emulsion (0.09 μm grain size, 96Cl: 4Br) was prepared by conventional double jet techniques. The emulsion was doped with a rhodium complex by dissolving the complex in the halide solution before mixing.

The silver solution and the halide/rhodium solution were jetted into a gelatin solution at a temperature of 40° C. After nucleation, soluble salts were removed by conventional coagulation methods. The emulsion was then sensitised with sodium tetrachloroaurate and sodium thiosulphate. A speed and contrast promoting agent (shown below) was added ($10^{-2}$ moles per mole of Ag) to the emulsion following chemical sensitisation:

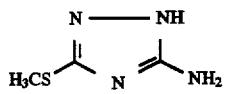

To this emulsion (0.1 mol) was added a dimethylformamide solution of the poly(vinyl hydroquinone) (3.4 g) prepared in Example 1 using a SYLVERSON dispersator to give a dispersion of solid particles (0.1 to 1.0 µm). Also added to the emulsion were Dimezone S (3.0 ml, 4% methanolic solution), a surfactant and a formaldehyde hardener. The emulsion was coated at a coating weight of 2.5 g Ag $m^{-2}$ together with a gelatin topcoat onto a clear polyester base (100 µm) bearing a conventional antihalation layer on the reverse side thereof to prepare a graphic arts type daylight contact film.

The resulting films were exposed through a 0 to 2.6 continuous tone light attenuating wedge via a SPEKTRA-PROOF UV exposing frame. The exposed films were developed in RAPIDOPRINT activator and RAPIDOFIX fixer solutions, commercially available from Agfa. The sensitometric results obtained are shown in Tables 1 and 2 below.

TABLE 1

| Time in Bath (secs.) | Sensitometry[1] | | | |
|---|---|---|---|---|
| | Dmin | Dmax | Speed (log E) | Contrast |
| 5 | 0.10 | 3.97 | 1.03 | 6.75 |
| 10 | 0.10 | 3.97 | 1.02 | 6.52 |
| 20 | 0.09 | 4.02 | 1.02 | 6.51 |
| 40 | 0.11 | 4.00 | 1.01 | 6.42 |

[1]data are the means of three replicates, at room temperature (21° C.).

TABLE 2

| Time in Bath (secs.) | Temp. of Bath (°C.) | Sensitometry | | | |
|---|---|---|---|---|---|
| | | Dmin | Dmax | Speed (log E) | Contrast |
| 5 | 30 | 0.09 | 3.96 | 1.07 | 6.88 |
| 5 | 35 | 0.19 | 3.99 | 1.06 | 6.38 |
| 10 | 35 | 0.13 | 3.99 | 1.07 | 6.88 |

EXAMPLE 3

A ruthenium and iridium doped silver chlorobromide emulsion (0.25 µm cubic grains, 64Cl: 36Br) was prepared by double-jet precipitation under conditions of controlled pAg. The emulsion was sensitised by sodium tetrachloroaurate and sodium thiosulphate digestion followed by spectral sensitisation in the green region of the spectrum with a conventional merocyanine dye to give an emulsion sensitive to light of wavelength 490 nm. Into this emulsion (at 40° C.) was dispersed the following solution utilising a SYLVERSON dispersator.

Solution C:
poly(vinyl hydroquinone) ) per mol Ag (34.0 g)
dimethylformamide 90 ml)

A methanolic solution of Dimezone S (4% solution, 30 ml per mol Ag) together with a surfactant (wetting agent) and a formaldehyde hardener were then added to the emulsion after which it was coated onto a clear polyester base (100 µm).

Samples of the resulting film were exposed by a Xenon flash through a 490 nm narrow band cut-off filter and through a 0 to 4 optical density continuous tone wedge. The exposed films were hand processed using RAPIDOPRINT and RAPIDOFIX solutions under a variety of conditions. The sensitometric results obtained are shown in Table 3 below.

TABLE 3

| Time in Bath (secs.) | Temp. of Bath (°C.) | Sensitometry | | | |
|---|---|---|---|---|---|
| | | Dmin | Dmax | Speed (log E) | Contrast |
| 10 | 22.5 | 0.06 | 2.90 | 1.98 | 1.86 |
| 20 | 22.5 | 0.05 | 2.88 | 1.93 | 1.46 |
| 10 | 30.0 | 0.10 | 2.99 | 1.99 | 2.09 |
| 20 | 30.0 | 0.08 | 3.35 | 2.06 | 2.57 |
| 20 | 35.0 | 0.23 | 3.48 | 2.04 | 3.08 |

A solution of polyvinylcatechol (34 g) in DMF (180 ml) was dispersed into a 0.23 micron cubic emulsion (1.0 mol) identical to that described above.

A 4% methanolic solution of dimezone S (30 ml) was also added and the emulsion was coated on to a polyester base at a coverage of 4.6 $gm^{-2}$. Activator processing of this film as described above indicates that polyvinylcatechol acts as an effective developing agent in this type of chlorobromide emulsion:

| Activator Processing | | | | |
|---|---|---|---|---|
| Time (sec) | Temperature (°C.) | Sensitometry | | |
| | | Dmin | Dmax | Contrast |
| 9 | 23 | 0.08 | 2.96 | 2.96 |
| 16 | 30 | 0.09 | 3.39 | 3.04 |
| 31 | 30 | 0.08 | 3.78 | 3.34 |

EXAMPLE 4

A silver chlorobromide emulsion identical to that of Example 2 was prepared and sensitised. To this emulsion (0.1 mol) was added 3.4 g of poly(vinyl catechol) dissolved in dimethylformamide (18 ml) using a SYLVERSON dispersator. Dimezone S (3 ml of a 4% methanolic solution per 0.1 mol Ag) was added to the resulting dispersion.

The emulsion was coated onto polyester base at a coating weight of 2.5 $gm^{-2}$ and exposed as described in Example 2. Nine seconds activation at 23° C. followed by fixation and washing as in Example 2 gave Sample 4(a). To demonstrate that polymeric developer incorporated film can also be processed through conventional developer without impacting the sensitometry a second Sample was processed for thirty seconds at 35° C. in a Rapid Access developer (RDC V commercially available from Minnesota Mining and Manufacturing Company), Sample 4(b). The results were:

| Sample | Developer | Dmin | Dmax | Contrast |
|--------|-----------|------|------|----------|
| 4 (a)  | Activator | 0.06 | 3.89 | 5.85 |
| 4 (b)  | RA Developer | 0.07 | 3.87 | 8.16 |

EXAMPLE 5

To test the stability of films incorporating poly(vinyl hydroquinone), samples of the silver chlorobromide emulsion prepared in Example 2 to which had been added poly(vinyl hydroquinone) (34 g per mol Ag) and dimezone S (1.2 g per mol Ag) were coated onto a polyester base to prepare a graphic arts type daylight contact film. The sensitometry of the film was determined as described in Example 2 both before and after incubation at 50° C. and 60% relative humidity for a period of 3 days. A control was provided by coating further samples of the silver chlorobromide emulsion containing hydroquinone (27.6 g per mol Ag) and Dimezone S (1.2 g per mol Ag) as primary and auxiliary developers therefor onto a polyester base and incubating them under identical conditions. The sensitometric results obtained are shown in Table 4 below.

TABLE 4

| Incorporated Developer | Sensitometry | | | |
|---|---|---|---|---|
| | Dmin | | Dmax | |
| | Before | After | Before | After |
| Poly(vinyl hydroquinone) | 0.09 | 0.07 | 2.85 | 3.01 |
| Hydroquinone | 0.06 | 0.05 | 3.32 | 1.57 |

EXAMPLE 6

Poly(vinyl hydroquinone) (34 g per mol Ag) and Dimezone S (4% methanolic solution, 30 ml per mol Ag) was added to a silver chlorobromide emulsion (0.23 μm) grain size, (64Cl: 36Br) prepared by conventional double jet techniques. The poly(vinyl hydroquinone) was dissolved in dimethylformamide and homogenised into the emulsion using a SYLVERSON dispersator by slow addition of the poly(vinyl hydroquinone) solution via a needle. The resulting emulsion was coated onto a clear polyester base.

Strips of the coated film were exposed with a Xenon flash through a 0 to 4 density filter and then processed for 20 seconds in one of the activators detailed below, followed by 40 seconds in RAPIDOFIX and finally a cold water wash.

Activator A:
  RAPIDOPRINT activator.
Activator B:
  RAPIDOPRINT activator thickened with 2% w/v sodium carboxymethylcellulose.
Activator C:
  sodium hydroxide 3 g
  potassium bromide 0.2 g
  anhydrous sodium sulphite 10.8 g
  water (deionised) 100 ml
Activator D:
  as per Activator C but with sodium carboxymethylcellulose (2 g).

Activator E:
  sodium hydroxide 3 g
  potassium bromide 0.2 g
  water (deionised) 100 ml
Activator F: as per Activator E but with sodium carboxymethylcellulose (2 g).

Processing using the above activators was achieved in one of two ways. For the non-thickened activators, i.e., Activators A, C and E, the exposed film strip was agitated in 80 ml of the activator solution contained in a measuring cylinder. For the thickened activators, i.e., Activators B, D and F, a thin film was produced by making a wire bound bar coating on a polyester sheet (No. 8 K-Bar) and contacting the exposed film (emulsion side down) onto this. "K-Bars" are wire-wound coating rods commercially available from R K Print-Coat Instruments Limited. Slight horizontal movement ensured an even sandwich of activator. After 20 seconds, the film was peeled off and placed in the fixer solution. The sensitometric results obtained are shown in Table 5 below:

TABLE 5

| Activator | Dmin | Dmax | Speed (Log E) | Contrast[1] A | B |
|---|---|---|---|---|---|
| A | 0.04 | 3.30 | 1.76 | 0.42 | 0.28 |
| B | 0.08 | 3.30 | 2.91 | 0.97 | 2.17 |
| C | 0.09 | 3.12 | 2.29 | 1.39 | 0.65 |
| D | 0.09 | 3.78 | 3.19 | — | — |
| E | 0.05 | 2.12 | 1.17 | 0.30 | 0.63 |
| F | 0.04 | 2.27 | 2.62 | 0.46 | 1.30 |

[1]A and B are contrast values measured between 0.07 to 0.17 and 0.17 to 0.37 above fog respectively.

It can be seen that the use of a thin film of activator produces improvements in sensitometric characteristics.

EXAMPLE 7

A rhodium doped silver chlorobromide emulsion (0.09 μm grain size, 96Cl: 4 Br) was prepared using conventional double jet precipitation techniques. To this was added poly(vinyl hydroquinone) (34 g per mol Ag) and Dimezone S (4% methanolic solution, 30 ml per mol Ag) and the resulting emulsion coated onto a polyester base (2.5 g Ag/m$^2$) to prepare a graphic arts type daylight contact film. Strips of the coated film were then exposed through a 0 to 2.6 wedge filter on a SPECKTRAPROOF UV source (4 units). The exposed strips of film were then processed as detailed in Example 2. The sensitometric results obtained are shown in Table 6 below:

TABLE 6

| Activator | Dmin | Dmax | Speed (Log E) | Contrast[3] A | B |
|---|---|---|---|---|---|
| A | 0.07 | 2.53 | 0.81 | 1.63 | 2.66 |
| B | 0.15 | 4.00 | 1.09 | — | 3.66 |
| E[1] | 0.06 | 1.44 | 0.44 | 1.22 | 1.54 |
| E[2] | 0.08 | 2.68 | 0.86 | 2.44 | 4.88 |
| F | 0.07 | 2.86 | 0.92 | — | 4.50 |

[1]processing with a bulk solution of activator.
[2]processing with a thin film of activator with no thickening agent.
[3]A and B are contrast values measured between 0.07 to 0.17 and 0.17 to 0.37 above fog respectively.

It can be seen that the use of a thin film of activator to process the exposed film again shows some advantages in terms of sensitometry. The use of the thin film of activator without sodium carboxymethylcellulose gives similar results though a slight improvement is noticed when a thickening agent is present.

EXAMPLE 8

This Example demonstrates that films prepared in accordance with the invention and incorporating polymeric developers such as poly(vinyl hydroquinone) exhibit improved sensitometric data when processed in activators containing silver halide solvents. Samples of graphic arts contact film prepared as in Example 2 but omitting the gelatin topcoat and the antihalation layer were exposed through a 0 to 2.6 continuous tone wedge for 4 units on the SPECKTRA-PROOF UV light source and processed in Activator G and ITEK activator, commercially available from Mitsubishi, both of which contain silver halide solvents.

| Activator G | |
|---|---|
| $K_2SO_3$ | 618 g |
| $Na_2SO_3$ | 230 g |
| KOH | 498 g |
| NaOH | 32 g |
| NaBr | 16.4 g |
| $Na_3PO_4$ | 4 g |
| NaSCN | 438 g |
| Benzotriazole | 16.4 g |
| Phenylmercaptotetrazole | 2.37 g |
| $H_2O$ | 8050 g |

The above concentrate is diluted 1+1 with water before use.

The samples processed in Activator G and ITEK were compared to samples which had been processed in RAPIDOPRINT activator (no silver solvent) as a control. All strips were fixed in RAPIDOFIX and washed and dried before recording their D LogE curves. The results obtained from these trials were remarkably good as they showed low Dmins, significantly higher Dmaxs than the control, increased speed and higher contrast. The sensitometric results obtained are shown in Table 7 below:

TABLE 7

| Activator | Sensitometry | | | |
|---|---|---|---|---|
| | Dmin | Dmax | Speed | Contrast |
| RAPIDOPRINT* | 0.04 | 2.19 | 0.96 | 1.81 |
| | 0.06 | 2.20 | 0.95 | 2.78 |
| | 0.08 | 2.20 | 1.02 | 3.62 |
| ACTIVATOR G* | 0.05 | 3.74 | 1.11 | 6.62 |
| | 0.07 | 3.79 | 1.11 | 6.38 |
| | 0.07 | 3.74 | 1.18 | 6.27 |
| ITEK | 0.18 | 3.16 | 1.25 | 6.38 |

*duplicated values.

EXAMPLE 9

This Example demonstrates that the sensitometric properties of the silver chlorobromide emulsion prepared in Example 2 can be even further enhanced by modifying the formulation of Activator G to increase the amount of NaSCN from 2.2 % to 4.25 %. In a separate experiment the hydroxide ($OH^-$) content of Activator G was increased from 0.5 to 1.0 molar as a control therefor. The results are shown in Table 8 together with comparative values for commercial DRC 4 film processed in RDCII developer.

TABLE 8

| Processing Solution | Dmin | Dmax | Speed | Contrast |
|---|---|---|---|---|
| DRC4 processed in RDCII (Developer) | 0.05 | 4.17 | 1.08 | 6.75 |
| Activator G | 0.06 | 3.90 | 1.08 | 5.48 |
| Activator G (4.25% NaSCN) | 0.08 | 3.92 | 1.25 | 8.36 |
| Activator G (1.0 M.$OH^-$) | 0.07 | 3.82 | 1.21 | 6.75 |

From the above data it can be seen that some additional improvement can be achieved by increasing the concentration of NaSCN especially in the contrast of the film which is essential for the reproduction of hard edged dots. The increase in concentration of hydroxide did not produce any significant benefits.

EXAMPLE 10

A solution was prepared containing: poly(vinyl hydroquinone) (0.20 g), Dimezone S (0.20 g) and a wetting agent L1028 (0.2 ml, 2% solution) dissolved in methanol (10 ml). The solution was applied to an ONYX printing plate, commercially available from Minnesota Mining and Manufacturing Company, using K-Bar 4 to give a coating having a wet thickness of 36 μm. The plate was air-dried for one hour in the dark. Once dry, the plate was exposed for ten seconds to a tungsten source (Parker Graphics PL250) at a distance of 37 cm before processing in Activator G for 30 seconds followed by 30 seconds in ONYX fixer to prepare a printing plate for use on an APOLLO web press. Transmission and reflection densities were then measured and compared with values obtained for a standard, untreated ONYX plate that had been developed in conventional ONYX developer. The results are shown in Table 10 below.

TABLE 10

| | ONYX plate plus poly(vinyl hydroquinone) | | Standard ONYX plate | |
|---|---|---|---|---|
| | Image | Background | Image | Background |
| Transmission Optical Density | 2.33 | 1.74 | 2.17 | 1.79 |
| Reflective Optical Density | 0.49 | 1.27 | 0.57 | 1.29 |

The above results illustrate that an ONYX plate treated with poly(vinyl hydroquinone) is at least as good as, if not better than, an untreated plate.

The treated plate was subsequently run on the APOLLO web press using ONYX FOUNTAIN III for over 4000 impressions without signs of wear.

EXAMPLE 11

A cubic silver chlorobromide emulsion (84% AgCl) with a mean grain size of 0.1 micron was prepared and chemically sensitised. A coating of this emulsion at 3.2 $gm^{-2}$ served as a comparison, Example 11(a). To a second sample of the emulsion (1.0 mol) was added poly(vinylcatechol) (34 g) and 4% methanolic dimezone S (30 ml) and this was coated in an identical manner to provide an Example of the invention, Sample 11(b). In a third Example, Sample 11(c), polyvinylcatechol (34 g/mol Ag) was dispersed into the emulsion and this was coated on to a gelatin underlayer containing dimezone S at the same coverage as in Sample 11(b). The comparison Sample 11(a) was processed in a conventional Rapid Access developer for 30 seconds at 35° C., whilst invention Samples X(b), X(c) were activator processed for nine seconds at 23° C. The sensitometric results are summarised below:

| Sample | Processed | Dmin | Dmax | Contrast |
|---|---|---|---|---|
| 11 (a) (Comparison) | RA Developer | 0.06 | 4.62 | 7.31 |
| 11 (b) (Invention) | RA Developer | 0.06 | 4.75 | 5.85 |
|  | Activator | 0.06 | 4.60 | 6.32 |
| (11 (c) (Invention) | RA Developer | 0.06 | 4.74 | 6.32 |
|  | Activator | 0.06 | 4.12 | 6.16 |

RAPIDOPRINT and RAPIDOFIX (Agfa), ONYX, ONYX FOUNTAIN (Minnesota Mining and Manufacturing Company), ITEK (Mitsubishi), WARING, SYLVERSON, SPECKTRAPROOF, MAPROFIX, DIMEZONE S and APOLLO are all trade names.

We claim:

1. A black and white photographic element comprising as a photosensitive medium a layer of a silver halide emulsion characterized in that the photosensitive medium comprises in the same layer or in an adjacent layer thereto, a developer comprising a sufficient amount of a substantially non-diffusing polymeric compound to be developed in an activator solution comprising as a repeating unit thereof a structure having a nucleus represented by:

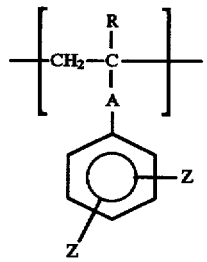

wherein;

A is a member selected from the group consisting of a bond or a divalent linking group, R is a member selected from the group consisting of hydrogen, an alkyl group comprising up to 5 carbon atoms and a halogen atom, Z is each independently a member selected from the group consisting of —OH and a group which leaves an —OH residue when contacted with an alkali (pH≧10) at temperatures of ≦50° C., wherein the groups represented by Z are in the ortho- or para-substitution patterns.

2. A black and white photographic element according to claim 1 wherein the polymeric compound has an average molecular weight of at least $1\times10^3$ and is in the form of solid particles having an average particle size of <10 μm dispersed in the emulsion layer and/or any adjacent layer thereto.

3. A black and white photographic element according to claim 1 wherein the polymeric compound is present in an amount sufficient to provide an equivalence of from 0.1 to 1 moles of the units of general formula (I) per mole of silver halide.

4. A black and white photographic element according to claim 1 which additionally comprises an auxiliary developer.

5. A black and white photographic element comprising as a photosensitive medium a layer of a silver halide emulsion characterized in that the photosensitive medium comprises in the same layer or in an adjacent layer thereto, a developer comprising a substantially non-diffusing polymeric compound comprising as repeating unit thereof a compound having a nucleus of general formula (VII):

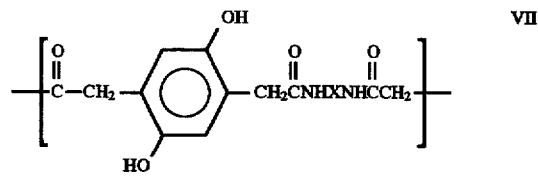

wherein;

X is a member selected from the group consisting of —CH$_2$CH$_2$— and —CH$_2$CH$_2$(OCH$_2$CH$_2$)$_y$OCH$_2$CH$_2$— where y is 0 or a positive integer.

6. A black and white photographic element comprising as a photosensitive medium a layer of a silver halide emulsion characterized in that the photosensitive medium comprises in the same layer or in an adjacent layer thereto, a developer comprising a substantially non-diffusing polymeric compound comprising as a repeating unit thereof a structure having a nucleus represented by general formula (V):

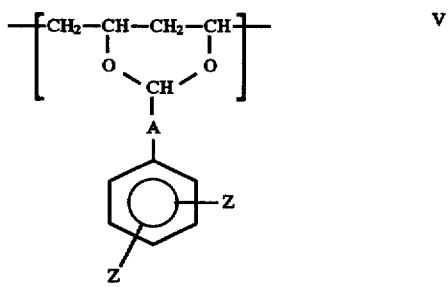

wherein;

each Z independently is a member selected from the group consisting of —OH and a group which leaves an —OH residue when contacted with an alkali (pH≧10) at temperatures of ≦50° C., wherein the groups represented by Z are in the ortho- or para-substitution patterns, and A is a member selected from the group consisting of a bond or a divalent linking group.

* * * * *